United States Patent [19]

Sakurazawa

[11] 4,067,677
[45] Jan. 10, 1978

[54] WHEAT FLOUR BAND ROLLING APPARATUS

[76] Inventor: Hatuo Sakurazawa, 15 banchi, Sinozuka, Fujioka, Gunma, Japan

[21] Appl. No.: 706,585

[22] Filed: July 19, 1976

[30] Foreign Application Priority Data

July 19, 1975    Japan ..................... 50-100370[U]

[51] Int. Cl.² .............................................. A21C 3/02
[52] U.S. Cl. ..................................... 425/135; 425/140; 425/141; 425/337; 425/367; 425/373
[58] Field of Search ............... 425/135, 141, 367, 372, 425/373, 145, 140, 337

[56]              References Cited
          U.S. PATENT DOCUMENTS

| | | | |
|---|---|---|---|
| 1,830,426 | 11/1931 | Crosland | 425/367 X |
| 2,156,895 | 5/1939 | Godat | 425/141 |
| 2,275,714 | 3/1942 | Anetsberger et al. | 425/367 X |
| 2,762,077 | 9/1956 | Markowitz | 425/135 X |
| 3,055,318 | 9/1962 | Engels | 425/337 X |
| 3,402,681 | 9/1968 | Manikian et al. | 425/367 |
| 3,476,058 | 11/1969 | Watkin et al. | 425/141 X |
| 3,531,827 | 10/1970 | Dragonette | 425/141 |

Primary Examiner—Richard B. Lazarus
Assistant Examiner—W. R. Briggs
Attorney, Agent, or Firm—Arnold S. Weintraub

[57] ABSTRACT

An endless belt conveyor extends from below a rolling part formed of each roller clearance of a series of linearly arranged rolling roller devices. The conveyor is either fixed or elevatably adjustable. Each roller device is driven by one common motor to the rolling part of the next rolling roller device so that a wheat flour band advancing while being rolled, in series, by each rolling roller device may be automatically introduced into the next rolling roller device. The band may be supported in case it becomes loose while being rolled and may be automatically introduced into the rolling part of the next rolling roller device even if it breaks.

6 Claims, 2 Drawing Figures

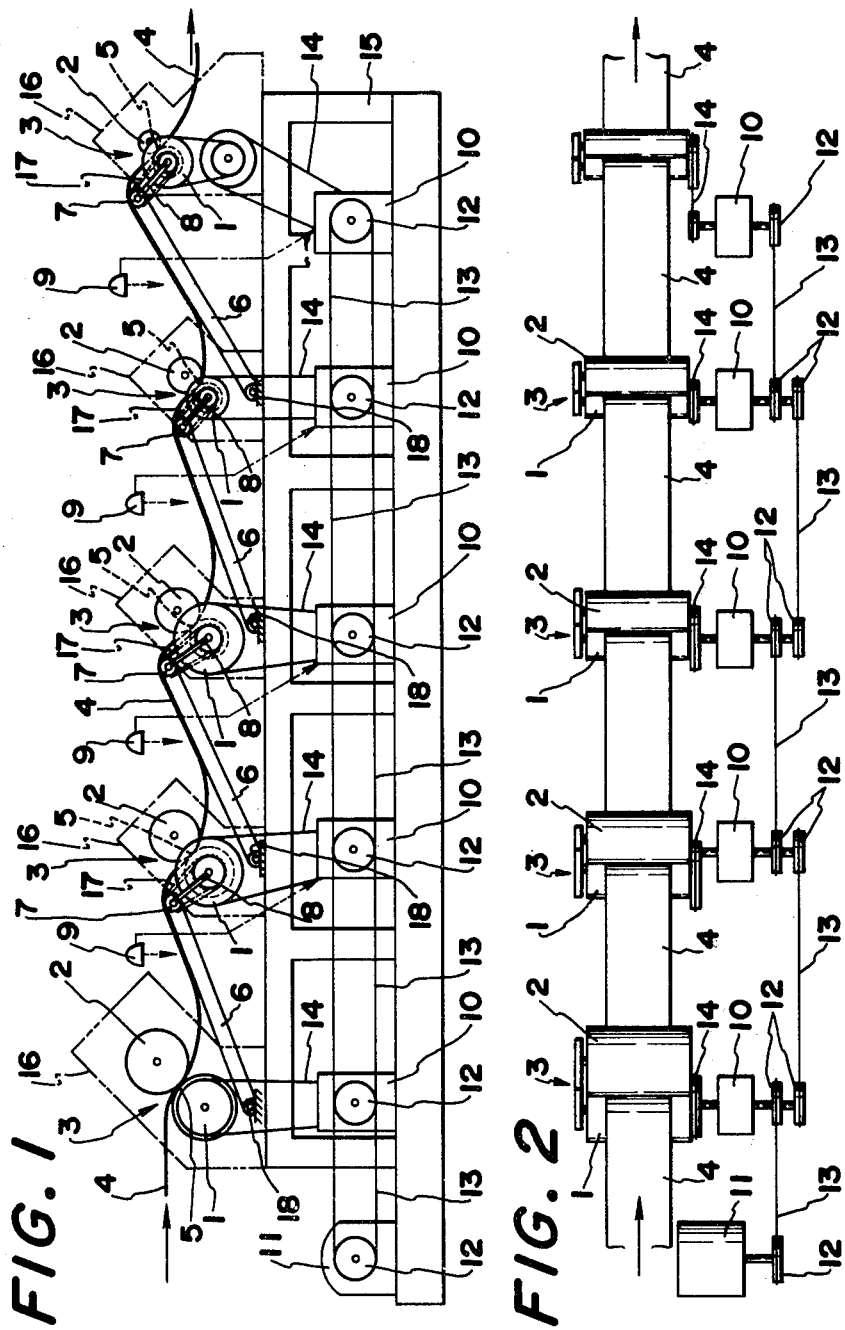

WHEAT FLOUR BAND ROLLING APPARATUS

BACKGROUND OF THE INVENTION

1. Field of the Invention

This invention relates to wheat flour band rolling apparatus. More particularly, the present invention pertains to an apparatus wherein endless belt conveyors are laid, respectively, between a series of rolling roller devices for rolling, in turn, a wheat flour band before it is finely cut into wheat flour noodles of any desired thickness. Even more particularly, the present invention pertains to apparatus wherein the wheat flour band may be automatically introduced into rolling parts or gaps, such that the apparatus may be continuously operated even in case the wheat flour band breaks and wherein the loosening of the band may be controlled easily.

2. Prior Art

An apparatus for rolling a wheat flour band, which is a raw material of wheat flour noodles, comprises several linearly arranged rolling roller devices so that the wheat flour band may be passed through these rolling roller devices to gradually roll the band to any desired thickness, wherefrom the band is introduced into a cutter or the like. In the conventional wheat flour band rolling apparatus, several rolling roller devices are merely linearly arranged. Therefore, the task of introducing the front end of the wheat flour band delivered out the rolling roller device into the next rolling roller device is manually done. Therefore, there have been defects that, in case a long wheat flour band breaks while passing through several rolling roller devices, it is necessary to manually introduce the front end of the succeeding wheat flour band into the next rolling device. Otherwise, the succeeding wheat flour band will be successively fed and accumulated there.

Even where the wheat flour band becomes loose between the respective rolling roller devices it will be mostly left as it is, will contact the dirty machine base and will become contaminated and the rolling work will have to be stopped.

Also, there have been many accidents where the worker has his hand wound in and crushed in the work of manually introducing the end part of the wheat flour band into the rolling part during the operation of the rolling roller device.

Furthermore, the rolling of the wheat flour band with each rolling roller device is so delicate that, even if each rolling roller device is controlled accurately, the band will naturally loosen due to the hardness and self-weight determined by its own water content or the like. Such loosening will amplify during the rolling step until finally the wheat flour band breaks.

In view of a series of such problems, the present inventor filed in Japan under the date of Sept. 7, 1974, Japanese patent application Ser. No. 108077/1974 for a wheat flour band rolling apparatus wherein endless belt conveyors are provided, respectively, from below the rolling parts of a series of rolling roller devices to the rolling parts of the next arranged rolling roller devices. The present invention is an improvement over the invention of said application.

OBJECTS OF THE INVENTION

An object of the present invention is to provide a wheat flour band rolling apparatus which is easy to control and is simple in structure.

Another object of the present invention is to provide a wheat flour band rolling apparatus wherein a wheat flour band can be, successively, automatically fed into linearly arranged rolling roller devices without requiring any manual operation.

A further object of the present invention is to provide a wheat flour band rolling apparatus wherein, even if the wheat flour band loosens between the rolling roller devices, it will be supported so as not to break during the progressive movement thereof.

A further object of the present invention is to provide a wheat flour band rolling apparatus wherein, even if the wheat flour band breaks during the progressive movement thereof, it will not become contaminated.

A still further object of the present invention is to provide a wheat flour band rolling apparatus wherein the operation of each rolling roller device can be automatically controlled in conformity with the feed and loosening of the wheat flour band.

SUMMARY OF THE INVENTION

According to the present invention, a series of rolling roller devices or rollers, each comprising a driving roller and an opposed driven roller are linearly arranged. An endless belt conveyor is disposed between the respective rolling roller devices and is either fixed in position or elevatably adjustable. The conveyor belt extends from below a rolling part, a gap formed between the driving roller of each rolling roller device, and the roller opposed to it to the same rolling part of the next rolling roller device. A distance detector is provided above the conveyor and a speed change gear associated with each of the rolling roller devices is connected with the distance detector so that the tension of the wheat flour band may be kept constant. In case the wheat flour band is very soft, the endless belt conveyor will always support it. In case the wheat flour band is hard, the endless belt conveyor will come to the rolling part only when the wheat flour band is to be introduced into the rolling part.

In the present invention, the endless belt conveyor always rotates in the same direction in conformity with the velocity of the wheat flour band fed by the operation of each rolling roller device. The belt is laid and disposed so as to come from below the rolling part of the rolling roller device to the rolling part of the next rolling roller device. The present invention, also, comprises a detector for detecting the loosening of the wheat flour band. The detector is disposed above and faces the endless belt conveyor so that the speed change gear provided in each rolling roller device may be controlled. The distance detector to be used herein may be a known photoelectric cell device or a sonar type device using ultrashort waves. Therefore, and in accordance herewith, the respective rolling roller devices can be driven by one common power source, such as an electric motor or the like.

According to the present invention, the wheat flour band is automatically introduced into the rolling roller device, the tension of the wheat flour band always being kept constant and, therefore, the working efficiency is higher. The wheat flour band does not contact the machine base or the like due to the loosening of the band and is, therefore, sanitary. Furthermore, the structure is simplified in relation to the driving source and the control is very easy.

BRIEF DESCRIPTION OF THE DRAWINGS

FIG. 1 is a side elevational view of the rolling apparatus of the present invention, and FIG. 2 is a top plan view of the present apparatus.

DETAILED DESCRIPTION OF THE PREFERRED EMBODIMENTS

Now, and with reference to the drawing, there is depicted a wheat flour band rolling apparatus in accordance herewith. The apparatus comprises a plurality of rolling roller devices 3. Each device 3 comprises a driving roller 1 and a roller 2 opposed to it. The devices 3 are arranged in a line in the direction of progressive movement of a wheat flour band 4. An endless belt conveyor 6 is laid between the respective rolling roller devices 3 from below a rolling part or gap 5 formed between the driving roller 1 and the opposed roller 2 to the rolling part or gap 5 of the next rolling roller device 3. The endless belt conveyor 6 has a rotary lever 8 fitted between a pulley 7 at one end and a rotary shaft of the driving roller 1. This arrangement enables the conveyer 6 to lower during the normal operation but to rise when the front end of a wheat flour band is to be passed through each rolling part 5, as well as when a wheat flour band is so soft that it loosens down between rolling roller devices. Thus, the rotary lever and pulley cooperate to define means operable for raising and lowering the conveyor belt.

A distance detector 9 is provided above the endless belt conveyor 6 comprising means operable to detect the tension of the wheat flour band 4. The distance detector 9 may be of any conventional construction which can measure the distance from the wheat flour band, such as with ultrasonic waves and photoelectric cells.

Means operable to adjust roller device speed, such as a speed change gear 10 is connected with each rolling roller device 3 and is, also, connected with the distance detector 9 so that each rolling roller device 3 rotates at a velocity matching the tension of the wheat flour band 4 as detected by the distance detector 9. In this manner, the tension of the band is kept constant.

The speed change gear 10 comprises an alternating current brushless speed change gear but may comprise any other speed change gear.

As the wheat flour band 4 passes through the series of rolling roller devices, the band will become thinner and, therefore, will become longer with the variation of the thickness. Therefore, the peripheral velocities of the successive driving rollers 1 and the opposed rollers 2 increase with the progressive movement of the wheat flour band 4.

The rolling roller devices 3 are driven by a common motor 11 or other means operable to drive same. Each speed change gear 10 has a sprocket or pulley 12 associated therewith. An endless V-belt or chain 13 extends from the motor through each of the speed change gears 10 to drive each of the gears 10 by the common motor 11. Each speed change 10 is interconnected to its associated driving roller 1 through an endless V-belt or chain 14.

The front end of each conveyer belt 6, which is driven by the associated pulley 7 is, in turn, driven by an associated endless sprocket chain 17 which extends between the driving roller 1 and the associated pulley 7.

The motor 11 and the speed change gears 10 are mounted on a machine frame base 15 of a machine frame 16.

When the front end of the wheat flour band 4 is introduced into the rolling part 5 of the first rolling roller device 3 and is delivered on the other side, it will be mounted on the first endless belt conveyor 6, wherefrom it will be guided and transferred into the next rolling roller device 3 and will be introduced into its rolling part or gap 5. Thus, the long wheat flour band 4 will automatically pass through all the rolling roller devices 3 so as to be rolled to any desired thickness and will be introduced into the next step of the noodle forming operation. Only when the front end of the wheat flour band 4 is to be introduced into the rolle part or gap 5 and the rear end of the wheat flour band is to pass through the rolling part or gap 5, will the endless belt conveyor 6 be in the illustrated position. During the normal operation of each rolling roller device 3, the endless belt conveyor 6 my be lowered by the rotation of the rotary lever 8 or it may always be in the rolling part or gap 5 so as to support the wheat flour band, as illustrated.

The pulley at the rear or terminal end of the endless belt conveyor has its shaft guided by rails 18 so as to be able to retreat when the endless belt conveyor 6 is to be lowered.

In case the wheat flour band 4 breaks during the rolling operation, as detected by the distance detector 9, the endless belt conveyor 6 will rise to guide and introduce the succeeding wheat flour band 4 into the rolling part or gap 5. Furthermore, in case the wheat flour band 4 becomes so loose as to always contact the endless belt conveyor 6 during the operation or becomes too loose or tense while the endless belt conveyor 6 is lowered, the distance detector 9 will also detect the variation of the distance from the wheat flour band 4 and will instruct the speed change gear 10 to adjust the velocity of the rolling roller device 3 so as to dissolve the loosening or tension and to maintain a constant tension. In other words, if the loosening or tension of that part of the band is dissolved by adjusting the velocity of the rolling roller device 3, the velocity of the wheat flour band 4 in the other part will vary in relation to it and the band 4 will become loose or tense in each part. Each distance detector 9 will detect the loosening or tension in each part and will instruct each speed change gear 10 to change to speed so as to balance the entire band and to adjust it to be under a constant tension.

I claim:

1. A wheat flour band rolling apparatus, comprising:
   a. a plurality of rolling roller devices, each device comprising a driving roller opposed to it, the rollers cooperating to define a gap therebetween, the devices being linearly arranged in the direction of progressive movement of a wheat flour band,
   b. means operable to drive the driving rollers of the rolling roller devices,
   c. an endless belt conveyor disposed between adjacent rolling roller devices and extending from beneath the gap of one of the rolling roller devices to the front, as defined by the directing of movement of the band, of the gap of the other rolling roller devices,
   d. means operable to detect the tension of the wheat flour band associated with each endless belt conveyor, the detecting means sensing the tension of the band when the band is above the associated conveyor, and e. a plurality of means operable to adjust the speed of each rolling roller device in response to the detecting means, each one of the means being associated with one of the rolling roller devices, each adjusting means being fitted between the gap of the associated device and the conveyor associated therewith.

2. The wheat flour band rolling apparatus of claim 1 wherein the detecting means is disposed above the wheat flour band.

3. The wheat flour band rolling apparatus of claim 1 wherein the detecting means is disposed below the wheat flour band.

4. The wheat flour band rolling apparatus of claim 1, wherein:

the drive means comprises a common driving source for the rolling devices, the driving source being connected to the speed adjusting means associated with each rolling roller device, and further wherein the speed adjusting means are interconnected so as to be respectively separately controllable by any one detecting means.

5. The wheat flour band rolling apparatus of claim 1 which further comprises:

a pulley disposed at the front end of each endless belt conveyor, each pulley being elevatably borne so that the endless belt conveyor may lower from the associated gap.

6. The wheat flour band of claim 1 which further comprises:

means operable to raise and lower the conveyors in response to the detecting means such that the wheat flour band can be supported and progressively guided by the conveyors, as required, in relation to the tension thereof.

* * * * *